US008406928B2

(12) United States Patent
Gupta et al.

(10) Patent No.: US 8,406,928 B2
(45) Date of Patent: Mar. 26, 2013

(54) METHODS FOR CONTROLLING POLYOLEFIN REACTOR TEMPERATURE

(75) Inventors: Anurag Gupta, Sugarland, TX (US); Donald W. Verser, Houston, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 734 days.

(21) Appl. No.: 12/468,702

(22) Filed: May 19, 2009

(65) Prior Publication Data
US 2009/0228259 A1 Sep. 10, 2009

Related U.S. Application Data

(62) Division of application No. 10/694,565, filed on Oct. 27, 2003, now abandoned.

(51) Int. Cl.
*G06G 7/48* (2006.01)
(52) U.S. Cl. ......... 700/269; 700/266; 700/268; 700/282
(58) Field of Classification Search ............... 700/266, 700/268, 269, 282
See application file for complete search history.

(56) References Cited

U.S. PATENT DOCUMENTS

| | | | |
|---|---|---|---|
| 3,676,653 A | 7/1972 | Arens et al. | |
| 3,936,885 A | 2/1976 | Mutafelija | |
| 3,971,411 A * | 7/1976 | Baumann | 137/625.3 |
| 4,064,392 A | 12/1977 | Desalu | |
| 4,114,850 A | 9/1978 | Alamprese | |
| 4,125,129 A * | 11/1978 | Baumann | 137/625.3 |
| 5,435,972 A * | 7/1995 | Daw et al. | 422/108 |
| 5,455,076 A * | 10/1995 | Lee et al. | 427/427.4 |
| 5,697,436 A | 12/1997 | Johnson et al. | |
| 5,992,229 A * | 11/1999 | Pyotsia et al. | 73/168 |
| 6,165,418 A | 12/2000 | Anderson et al. | |
| 6,235,852 B1 | 5/2001 | Hess et al. | |
| 6,252,016 B1 | 6/2001 | Wu et al. | |
| 6,283,152 B1 | 9/2001 | Corte, Jr. | |
| 6,293,514 B1 | 9/2001 | Pechoux et al. | |
| 6,789,617 B1 | 9/2004 | Hashizume et al. | |
| 2002/0053652 A1 | 5/2002 | Freisinger et al. | |

FOREIGN PATENT DOCUMENTS

| | | |
|---|---|---|
| EP | 1000097 | 9/2002 |
| WO | 0250127 | 6/2002 |

OTHER PUBLICATIONS

Control Valve website: http://www.spiraxsarco.com/resources/steam-engineering-tutorials/control-hardware-el-pn-actuation/control-valve-characteristics.asp, May 9, 2009.

* cited by examiner

*Primary Examiner* — Brian R Gordon
*Assistant Examiner* — Shogo Sasaki
(74) *Attorney, Agent, or Firm* — Fletcher Yoder P.C.

(57) ABSTRACT

Methods for controlling polyolefin reactor temperature. In one embodiment, a simulation model is constructed for improving control of polymerization temperature in a polyethylene loop slurry reactor. The model is used to design the reactor coolant system to capacity and to improve tuning of system controllers, such as the reactor temperature controller and coolant temperature controller. A coolant control valve is sized having a bilinear flow characteristic that improves Cv reproducibility at low coolant flow rates and thus improves reactor temperature control.

13 Claims, 9 Drawing Sheets

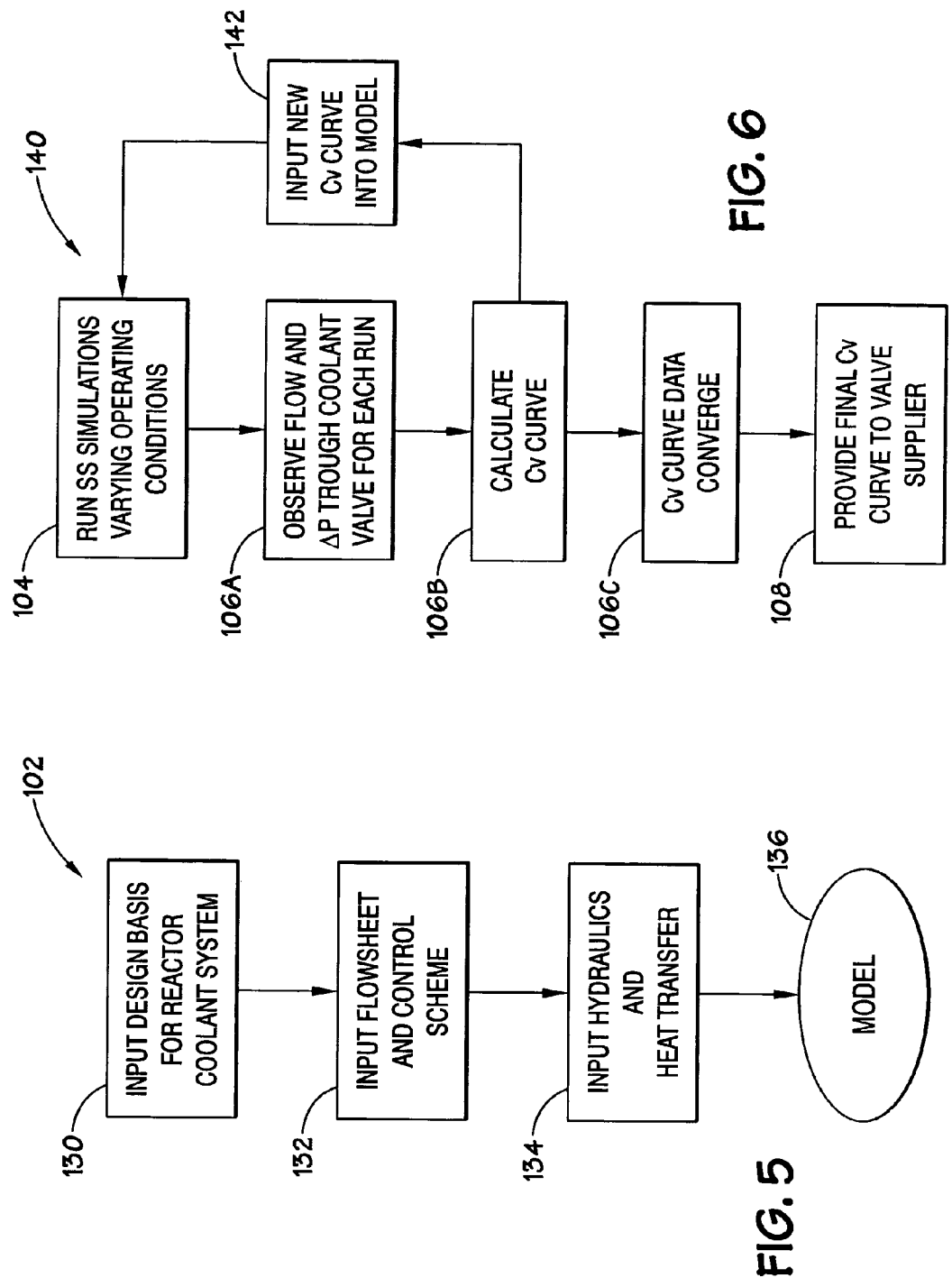

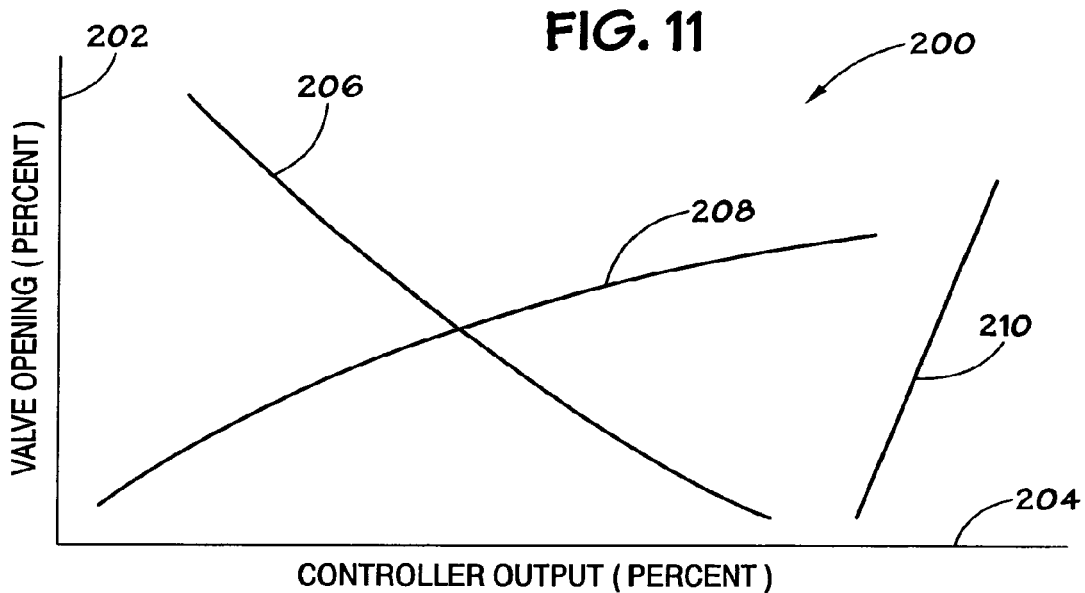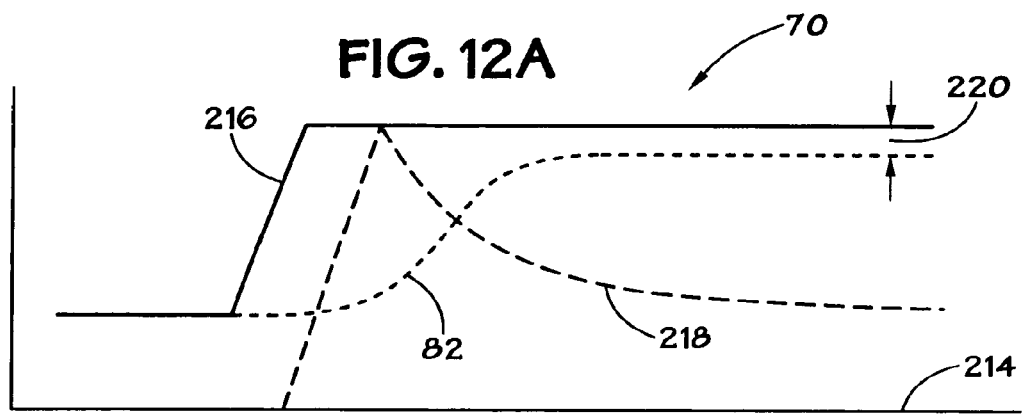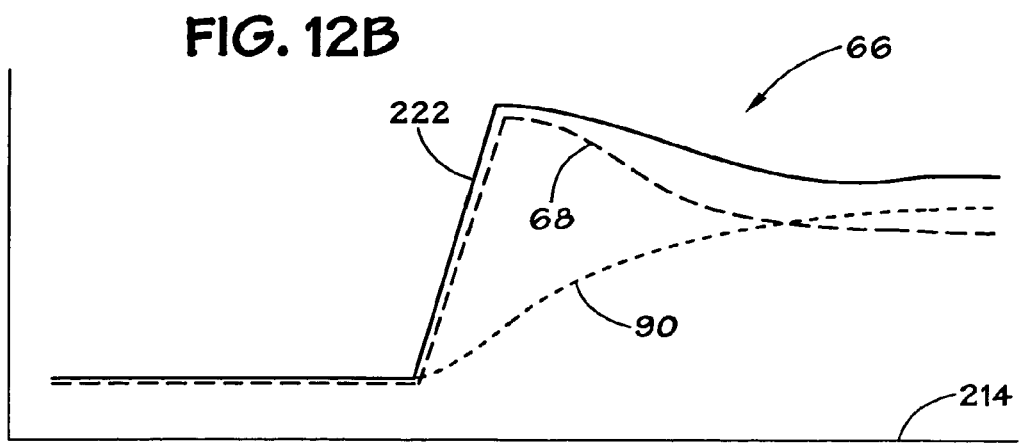

METHODS FOR CONTROLLING POLYOLEFIN REACTOR TEMPERATURE

RELATED APPLICATION

This application is a divisional of U.S. patent application Ser. No. 10/694,565, filed on Oct. 27, 2003, now abandoned entitled "Method and Apparatus for Controlling Polyolefin Reactor Temperature," which is herein incorporated by reference in its entirety.

BACKGROUND OF THE INVENTION

1. Field of the Invention

The present invention relates generally to the polymerization of polyolefins and, more specifically, to the use of a coolant system and simulation model to control temperature in a polyethylene loop slurry reactor.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

In the specific example of polyethylene, various types may include, for example, high density polyethylene (HDPE), low density polyethylene (LDPE), and linear low density polyethylene (LLDPE). Applications for HDPE, for example, include the manufacture of blow-molded and injection-molded goods, such as food and beverage containers, film, and plastic pipe. Other types of polyethylene, such as LDPE and LLDPE, are also suited for similar applications. Within each type of polyethylene, there may be various grades tailored to specific applications. Each grade is typically defined by the specifications of the polyethylene properties, such as density and melt index. The different types or grades of polyethylene may be produced using the same loop slurry reactor. For example, a single loop slurry reactor may be used to produce both HDPE and LLDPE, as well as multiple different grades of both HDPE and LLDPE. The reaction conditions (or "recipe") are adjusted to polymerize different types and grades of polyethylene.

Polyethylene is generally produced in bulk by petrochemical facilities, which have ready access to ethylene, the dual carbon molecular building block of the much longer polyethylene polymer. Various processes exist by which ethylene may be polymerized to form polyethylene. The polymerization process itself is exothermic, or heat-generating, and is typically performed in closed systems where temperature and pressure can be regulated to maximize production. As with any such closed system where heat is generated, some means must be supplied to remove heat and thus to control the polymerization temperature. For loop slurry reactors, a coolant system is typically used to remove heat.

Variations in feedstocks, utility supplies, and reaction kinetics induce variations in the reactor (polymerization) temperature. These variations should be mitigated by the reactor temperature control scheme and the reactor coolant system. The control scheme and coolant system should also accommodate reactor upsets caused, for example, by undesirable slug feed of reactants or by rapidly changing heat transfer behavior in a fouling reactor. As will be appreciated by those skilled in the art, an intricate control scheme is normally used to direct the coolant system to maintain the reactor temperature at a desired set point. The complexity of the temperature control typically involves a cascade control scheme, or in other words, a primary controller (i.e., that maintains reactor temperature) that directs a slave controller (i.e., that maintains coolant temperature). The slave controller may send an output to adjust the position of one or more valves in the coolant system. The polyethylene industry has spent considerable engineering and operating resources to understand and improve reactor temperature control.

Problems with coolant control valve sizing and with tuning of the primary and slave controllers have caused poor temperature control of the polymerization. These problems cause the coolant system to remove too little heat or too much heat from the reactor. Poor temperature control in the reactor increases the cost to manufacture polyethylene. In particular, poor temperature control in the reactor results in a wider design basis for coolant system equipment and thus increases equipment costs. Furthermore, swings in reactor temperature impact reactor stability and can lead to a reactor foul and/or unplanned shutdown. Additionally, polymerization temperature affects the properties of the polyethylene and thus poor control of reactor temperature cause off-spec production of polyethylene.

BRIEF DESCRIPTION OF THE DRAWINGS

Advantages of the invention may become apparent upon reading the following detailed description and upon reference to the drawings in which:

FIG. 5 is a block diagram an overview of a method for constructing a simulation model for a polyethylene loop slurry reactor in accordance with the present invention;

FIG. 6 is a block diagram of a method for generating flow characteristic for a coolant valve in accordance with the present invention;

FIG. 11 is a plot of valve openings versus controller output for three valves in the reactor coolant system in accordance with the present invention;

FIG. 12a is a plot showing a change in reactor set point (reactor temperature) and the output of the reactor controller predicted by the simulation model in accordance with the present invention;

FIG. 12b is a plot showing a change in coolant controller set point (coolant supply temperature) and the output of the coolant controller predicted by the simulation model in accordance with the present invention.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present technique utilizes a dynamic simulation model and custom control valve that provide for significant improvement in reactor temperature control. With the current improvements, reactor temperature may be controlled within a desired tolerance, for example, within +/−0.25° F. The simulation model and the new valve design having a bilinear flow characteristic, for example, extensively facilitate better design and operation of polyethylene reactor coolant systems, and thus reduce associated costs. Additional benefits may include reduced off-spec polyethylene production, improved reactor stability, and reduced equipment costs.

The model simulates operation of the reactor coolant system including both steady state and dynamic simulations. A significant improvement over previous analyses of the reactor temperature control is that the reactor heat transfer coefficient is no longer assumed constant. Instead, the model simulates changing heat transfer capability of the system to transfer heat from the reactor contents to the coolant in the reactor jackets (temperature control jackets).

The model may be used to generate valuable flow characteristic data for one or more control valves in the coolant system. This data may be provided to the valve supplier so that the supplier may manufacture the one or more valves in accordance with the desired flow characteristics. The resulting one or more valves may be used to control the amount of coolant that flows through a cooler in a reactor coolant system. Additionally, the model may also be used to effectively tune the coolant system controllers, greatly improving reactor stability. Furthermore, the model may be used to better design coolant system equipment, significantly reducing equipment costs. In particular, smaller equipment, such as smaller pumps, heat exchangers, and control valves, may be used. As a result of the model and the resulting one or more control valves, the cost to manufacture polyethylene may be reduced.

Reactor Temperature Control

A. Polyethylene Loop Slurry Reactor

Figure 1:
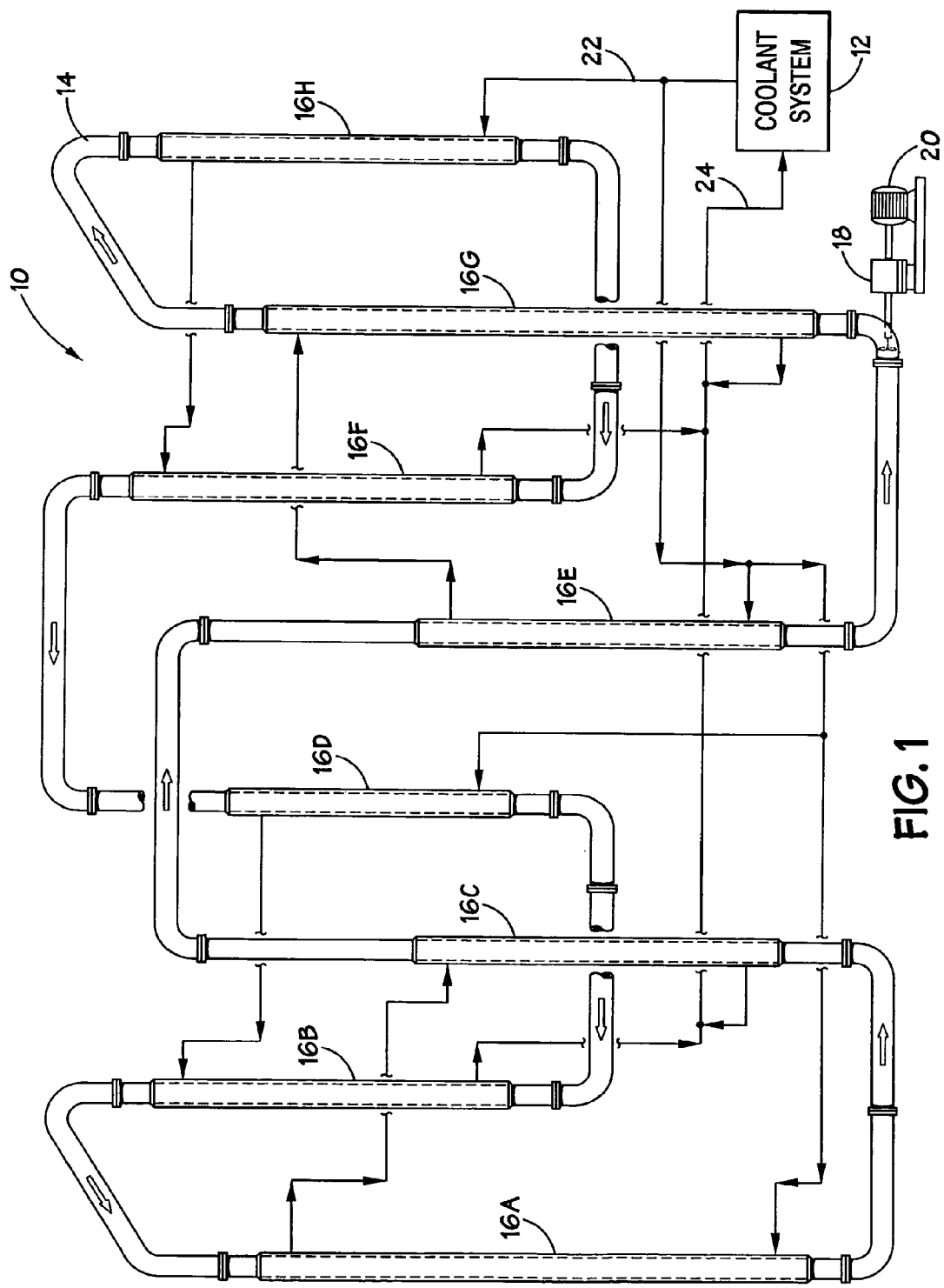
FIG. 1 is a process flow diagram of an exemplary polyethylene loop slurry reactor in accordance with the present invention.

Turning now to the drawings, and referring initially to FIG. 1, a process flow diagram of an exemplary polyethylene loop slurry reactor and coolant system generally designated by reference numeral 10 is depicted. The coolant system 12 removes heat from the loop reactor 14 via reactor jackets 16A-H. The loop reactor 14 is generally composed of segments of pipe connected by smooth bends or elbows. The reactor 14 may be used to carry out polyethylene polymerization under slurry conditions in which insoluble particles of polyethylene are formed in a fluid medium and are suspended as slurry until removed. In particular, the fluid medium may include diluent (such as isobutane), ethylene, comonomer (such as hexene), co-catalysts, molecular weight control agents, and any other desired coreactants or additives which are added to the reactor interior via inlets or conduits (not shown) at specified locations. Likewise a catalyst also may be added to the reactor 14 via a conduit (not shown) at a suitable location. The catalyst can be any suitable catalyst for polymerizing the monomers which are present. An example of such a catalyst is a chromium oxide containing a hexavalent chromium (or $Cr^{+2}$) on a silica support. The added components generally compose a fluid medium within the reactor 14 within which the catalyst is a suspended particle.

A motive device, such as pump 18, circulates the fluid slurry in the reactor 14. An example of a pump 18 is an in-line axial flow pump with the pump impeller disposed within the interior of the reactor 14 to create a turbulent mixing zone within the fluid medium. The impeller may also assist in propelling the fluid medium through the closed loop of the reactor, as depicted by arrows, at sufficient speed to keep solid particulates, such as the catalyst or polyethylene product, suspended within the fluid medium. The impeller may be driven by a motor 20 or other motive force.

As the polymerization reaction proceeds within the reactor 14, the ethylene monomer (and comonomers) polymerize to form polyethylene polymers that are substantially insoluble in the fluid medium at the reaction temperature, thereby forming a slurry of solid particulates within the medium. These solid polyethylene particulates may be removed from the reactor 14 via a settling leg (not shown) or other means, such as a continuous take-off. In downstream processing, the polyethylene discharged from the reactor may be extracted from the slurry and purified.

The reaction conditions may be optimized to facilitate the desired degree of polymerization and the desired reaction speed while keeping the temperature below that at which the polymer product would go into solution. Due to the exothermic nature of the polymerization reaction, cooling jackets 16A-H may be provided around portions of the closed loop system through which a cooling fluid is circulated as needed to remove excess heat (heat of reaction), thereby maintaining the temperature within the desired range, generally between 150° F. to 250° F. (65° C. to 121° C.).

In general, reactor temperature varies linearly with changes in the reactor system operating conditions. Typical reactor temperature control involves a proportional-integral-derivative (PID) algorithm because PID control is well-suited for controlling a linear process. An accepted assumption in the art is that heat generated in the reactor by the exothermic polymerization is linear with the polyethylene production rate (i.e., pounds per hour of polyethylene polymerized). Thus, reactor temperature, which is an indication of the energy or heat in the reactor, varies linearly with production rate. This linear assumption is only an approximation, however, and therefore, the reactor temperature control may also involve a cascade scheme. The inner or secondary loop of a cascade control scheme may correct for non-linear behavior in the reactor process.

B. Reactor Coolant System

Figure 2:
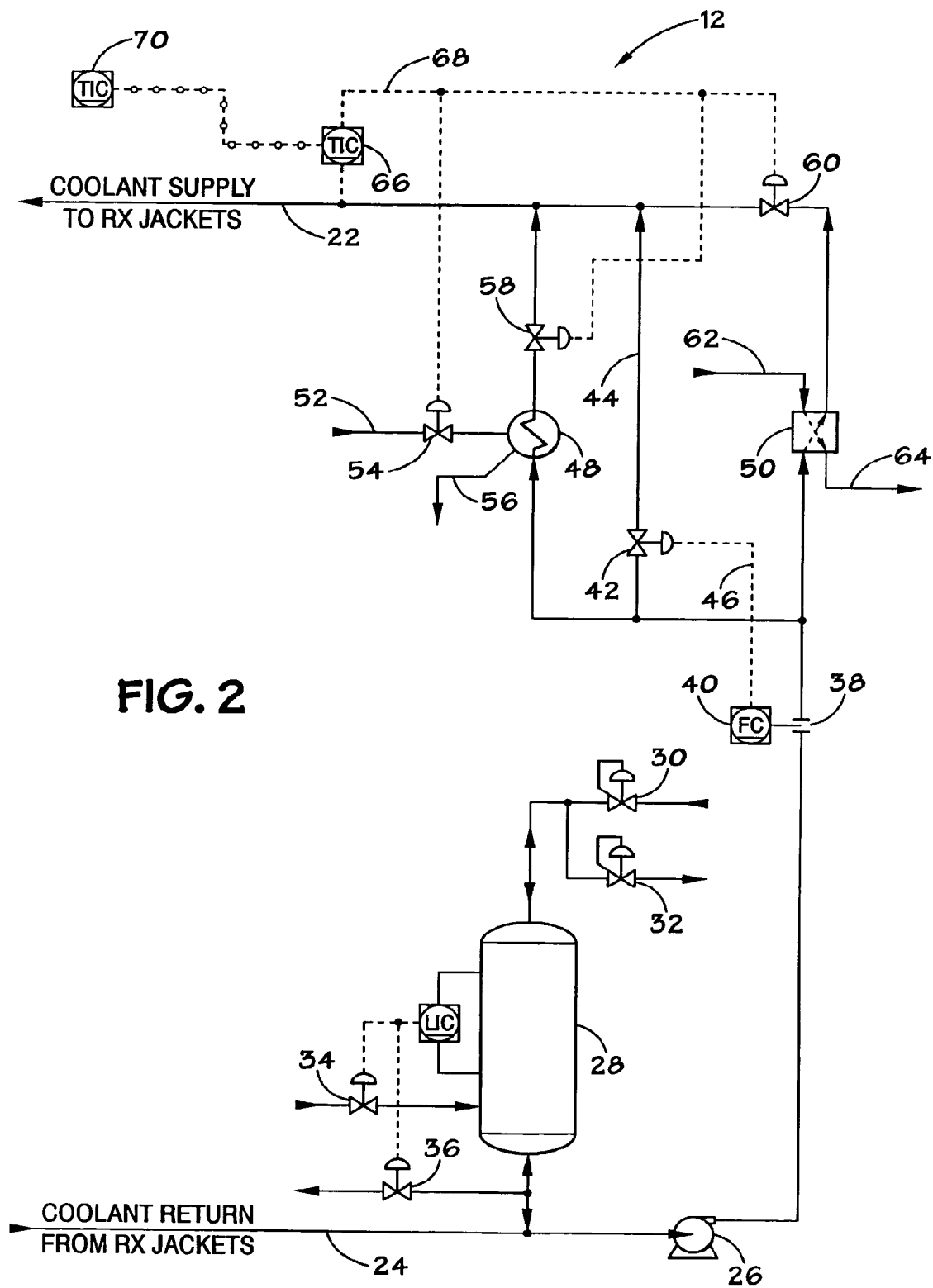
FIG. 2 is a process flow diagram of an exemplary coolant system used in the temperature control of the polymerization reaction in the loop slurry reactor of FIG. 1 in accordance with the present invention.

Referring to FIG. 2, a process flow diagram of a coolant system 12 for the polyethylene loop slurry reactor 14 of FIG. 1 is depicted. Coolant system 12 provides coolant supply 22 to reactor jackets 16A-H. Coolant system 12 receives coolant return 24 from reactor jackets 16A-H. A variety of coolants may be used to remove or add heat to the reactor system. In this illustrative embodiment, steam condensate (demineralized water) is used as the coolant. The coolant return 24 "carries" the heat removed from the reactor. The coolant system 12 transfers this heat to a utility cooling medium, such as to cooling tower water or sea water. The coolant system delivers "cooled" coolant supply 22 to the reactor jackets. Typical coolant supply 22 temperatures range from 105° F. to 150° F. and typical coolant return 24 temperatures range from 130° F. to 170° F.

Coolant flow through the coolant system 12 and through the reactor jackets 16A-H may be circulated, for example, by a centrifugal pump, as illustrated by coolant pump 26. An exemplary design basis of a coolant pump is approximately 50 to 60 pounds per square inch (psi) delivered head at 6 to 12 million pounds per hour of coolant. An example configuration of the reactor jackets 16A-H (FIG. 1) is two counter-current double-pipe exchangers operated in parallel, with the inner pipe (the reactor) having an approximate 22 inch internal diameter, and the outer pipe (the jacket) having an approximate 28 inch internal diameter. In this example, the total heat transfer area of the reactor jackets 16A-H is about 5,000 square feet.

The coolant circulation may be a closed loop, hydraulically full system. Surge drum 28 may be used to keep the system liquid full and to prevent swings in pressure of the coolant system by compensating for hydraulic expansion caused by coolant temperature swings. Pressure may be maintained constant at the pump 26 suction by controlling level and overhead pressure of the surge drum. A constant pressure gas pad may be maintained in the overhead of surge drum 28 to maintain a constant pump 26 suction pressure. For example, pressure regulator 30 may add nitrogen to the surge drum 28 overhead and pressure regulator 32 may remove gas from the overhead. Any suitable gas, such as nitrogen (inert), may be used for the gas pad on the surge drum 28 overhead. The pressure regulators 30 and 32 may be local control valves. A constant liquid level may be maintained in surge drum 28 by adding and draining coolant via level control valves 34 and 36 respectively. Recovery of the steam-condensate coolant removed from the system via level control valve 36 is normally not required.

The total coolant circulation flow rate through the coolant system and the reactor jackets is typically maintained constant and may be measured at flow element 38. The flow element 38 may represent, for example, a flow orifice plate installed in the coolant piping with pressure detection taps disposed on the piping upstream and downstream of the orifice. The control system may calculate the circulation flow rate based on the orifice size and the measured upstream and downstream pressures. The flow rate indication from flow element 38 is received by flow controller 40, which may be a control block in a distributed control system. To maintain total constant flow, the output of flow controller 40, using control signal 46, may adjust the position of the valve 42 on a flow bypass line 44. A well-known example of a distributed control system (DCS) in the art is the Honeywell TDC-3000 control system. Normally, it is desirable to minimize the movement of valve 42 position to prevent cycling in the coolant pump 26. Thus, additional means at other points in the system may assist in maintaining the total coolant circulation flow rate constant.

During normal operation of a polyethylene loop slurry reactor, heat is removed from the reactor contents. During start-up of the reactor, however, heat is added to the reactor contents to facilitate initiation of the polymerization. The coolant system 12 may be used to add heat to the reactor 14 contents until the polymerization becomes exothermic. Therefore, the coolant system may include a heater 48, which may represent one or more heaters. Steam 52, or some other heating medium, flows through steam supply valve 54 to the utility side of heater 48 to heat the reactor coolant on the process side of heater 48. During startup of reactor 14, relatively more reactor coolant flows through cooler bypass valve 58, which acts as a heater 48 valve. The cooler valve 60 is normally closed during startup of reactor 14 and opened after the reaction becomes exothermic to facilitate cooling rather than heating. It should be noted that the steam supply valve 54, cooler bypass valve 58, and cooler valve 60 are temperature control valves.

The heater 48 may be, for example, a shell and tube heat exchanger, a mixer, or an eductor, such as a pick heater. If a shell and tube heat exchanger is used, the steam 52 is normally not mixed with the coolant but instead condensed and removed as steam condensate, for example, via a steam trap (not shown) disposed on discharge 56. The condensate may be recovered or sent to drain (sewer). For the case of the heater 48 representing an eductor, such as a pick heater, the steam 52 is mixed with the coolant to heat the coolant via direct steam injection and, thus, the discharge 56 is typically not used. In one configuration, a four inch steam sparger adds 300 psig steam directly into the coolant through an 18 inch piping elbow.

After startup of reactor 14 and when the reaction in reactor 14 becomes exothermic, the normal operation of the coolant system is to remove heat from reactor 14. Thus, steam supply valve 54 is closed and no steam 52 is added to heater 48. Coolant will continue to flow through cooler bypass valve 58 but is not heated. Valve 58 modulates coolant flow through this primary bypass to maintain a constant total coolant flow to the reactor jackets, and thus to stabilize flow through the secondary bypass controlled by flow controller 44 and flow control valve 42.

Heat is exchanged during normal operation in cooler 50, which may represent one or more coolers. Heat is removed from the coolant in cooler 50 to cool the coolant supply 22 to the reactor jackets. The cooler 50 may be, for example, a shell and tube heat exchanger or a plate and frame heat exchanger. A cooling medium, such as cooling tower water or sea water, flows through the cooler opposite the coolant, removing heat through the heat transfer surface area but not commingling with the coolant. The cooling medium flow is represented in this example by cooling water supply 62 and cooling water return 64. A cooling tower (not shown) may process the circulating cooling medium by removing heat from the cooling water return 64 and providing cooled cooling water supply 62. Thus, the cooling tower water removes heat from the coolant, which in turn removes heat from the reactor.

In one example, the cooler 50 represents four plate and frame exchanger coolers that operate in parallel, each cooler having approximately 200 stainless steel (304) plates and approximately 1600 square feet of heat transfer surface, with the heat transfer coefficient varying from about 200 to over 800 Btu/hr/sq. ft/° F. as a function of coolant flow rate. Heat removed is about 15.5 million Btu/hr removed per cooler with a design pressure drop of approximately 3 psi on the coolant side.

In sum, during normal operation of the cooling system 12 and during normal production of polyethylene in reactor 14, steam supply valve 54 is closed. Cooler bypass valve 58 and cooler valve 60 are used to manipulate the flow to give the desired coolant supply temperature to the reactor jackets. For example, if a cooler coolant supply is desired, more coolant will flow through valve 60 to give more flow through the cooler 50, and less coolant will flow through valve 58 to balance the total hydraulic flow, maintaining constant the total coolant flow rate to the reactor jackets 16A-H (FIG. 1). Flow controller 40 and flow control valve 42 discussed previously represent additional means to maintain a constant total coolant flow to the reactor jackets. What is more, it should be noted that the placement of the coolant system control valves, such as cooler valve 60, may vary within the exemplary polyethylene loop slurry reactor system or other polyolefin production systems. For example, in polypropylene loop slurry reactor systems, the coolant valve, such as cooler valve 60, may more typically be disposed upstream of the cooler 50 instead of downstream as depicted in FIG. 2.

For the temperature control, coolant controller 66 (coolant temperature controller) maintains the temperature of the coolant supply to the reactor jacket. Coolant controller 66 sends an output signal 68 to adjust the positions of valves 58 and 60 (and valve 54 during startup). Coolant controller 66 receives its set point from reactor controller 70, which controls the temperature of the reactor 14. The set point of reactor controller 70 is entered by the operator. Thus, reactor controller 70 is the primary controller and coolant controller 66 is the slave controller in a cascade control scheme.

C. Temperature Control Scheme

Figure 3:
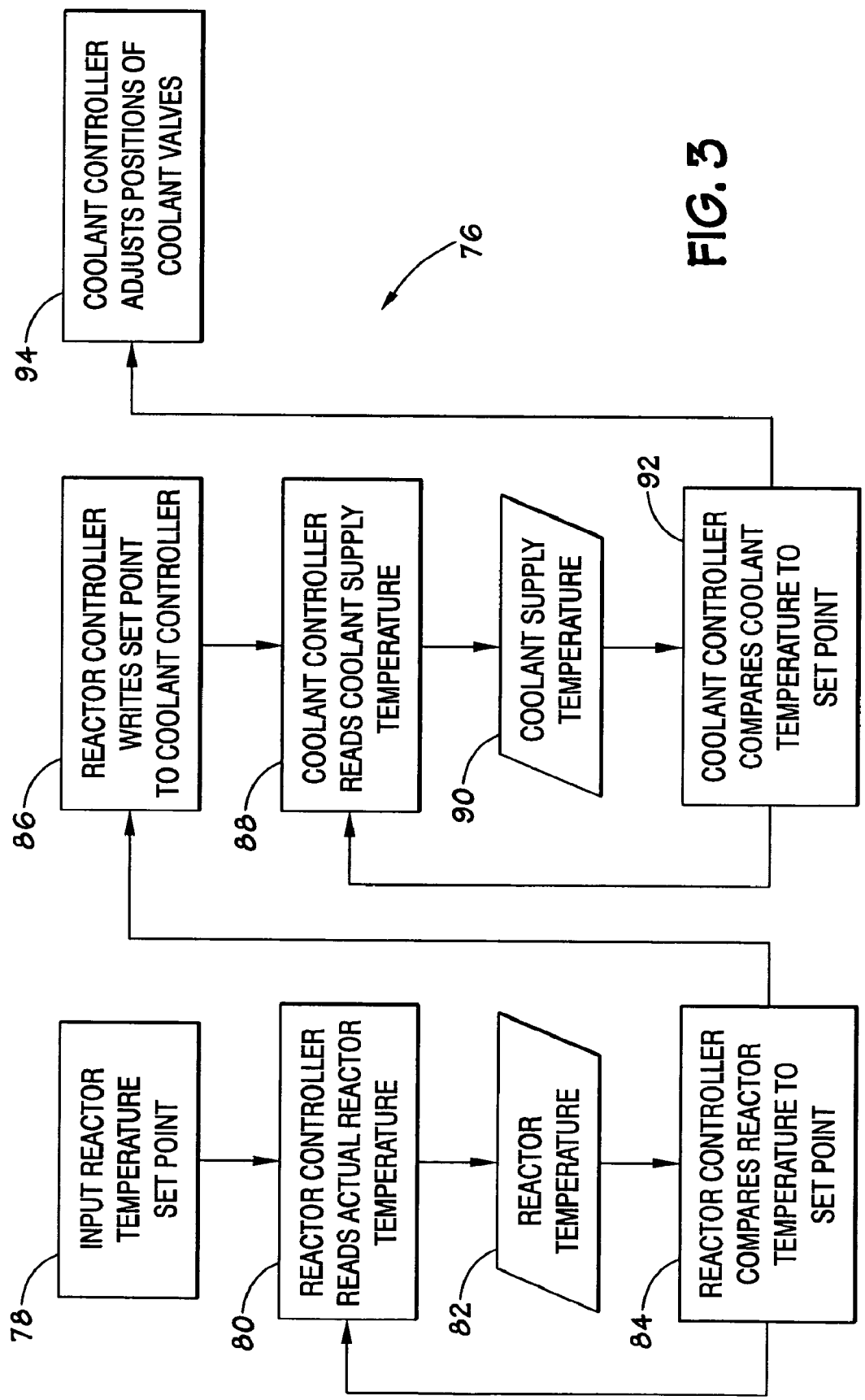
FIG. 3 is a flow diagram of an exemplary temperature control scheme for the loop slurry reactor and the coolant system (FIGS. 1 and 2) in accordance with the present invention.

Referring to FIG. 3, a flow diagram of the reactor temperature control scheme 76 of the reactor 14 of FIG. 1 is depicted. The controllers referenced in FIG. 3 are the coolant controller 66 and reactor controller 70, both of FIG. 2. Reactor controller 70 maintains the polymerization temperature in the reactor 14 at the desired set point. The operator inputs the desired temperature set point of the reactor into the reactor controller 70 (block 78). This desired polymerization temperature is typically based on the type of polyethylene or the specific grade of polyethylene.

The reactor controller 70 (block 80) reads the actual reactor temperature 82 from a temperature indicator or sensor located on the reactor 14. This temperature indication (i.e., measurement) may be accomplished, for example, by a temperature element, such as a thermocouple or resistance temperature device (RTD), inserted into a thermowell that extends into the reactor contents. The reactor temperature 82 (polymerization temperature) measured by this temperature element may be sent via an electronic signal, for example, to a distributed control system (DCS), a programmable logic (PLC) based system, or some other means of controlling the coolant system. The reactor controller 70 may be defined within the process control system, such as the DCS or PLC based system, and configured to read the reactor temperature 82.

The reactor controller 70 (block 84) compares the actual reactor temperature 82 versus the set point entered by the operator. The error between the set point and measured value drives the controller 70 action (output). The tuning parameters of the reactor controller 70 decide this action. The reactor controller 70 may write a coolant temperature set point (block 86) to coolant controller 66 to ultimately help maintain the reactor temperature 82 at its set point. A typical desired tolerance in polyethylene slurry reactor technology is to control the actual reactor temperature 82 at set point plus or minus 0.25° F. The cascade nature of the overall control scheme is reflected by the fact that the reactor controller 70 output supplies the coolant temperature set point to the coolant controller 66.

The coolant controller 66 maintains the coolant supply temperature 90 at the desired coolant temperature set point. The coolant controller 66 (block 88) reads the temperature 90 of the reactor coolant supply 22 (FIGS. 1 and 2). The coolant controller 66 compares (block 92) the actual coolant supply temperature 90 versus the coolant supply temperature set point supplied by the reactor controller 70. Based on the error between the measured coolant temperature 90 and the set point generated by the reactor controller 70, the coolant controller 66 may send an output signal to adjust (block 94) the position of the cooler valve 60 and cooler bypass valve 58. The coolant controller 66 may also send an output signal to adjust (block 94) the position of steam supply valve 54, for example, during start-up. In general, as with the reactor controller 70, tuning parameters or constants define the actual controller 66 action or output. In sum, coolant controller 66 controls the coolant supply 22 temperature 90 needed to maintain the reactor temperature 82 at set point, and also works in conjunction with flow controller 40 (FIG. 2) to maintain constant total coolant flow to the reactor jackets. It should be noted that with the present technique, the simulation model may be used to determine controllers 66 and 70 tuning parameters to maintain reactor temperature within set point plus or minus the desired tolerance of +/−0.25 F.

Some configurations of coolant systems for polyethylene loop slurry reactors may require a second cooler valve disposed in parallel with cooler valve 60 (FIG. 2). This second valve may not be a spare but instead sized differently than the first. Excessive uncertainty in reactor temperature control necessitates the requirement of two valves. In particular, it is difficult for a single valve to handle the wide design basis caused by poor temperature control in the reactor.

An embodiment of the present technique eliminates the need for two valves. A model generates unique Cv data (bilinear) and also more precisely tunes the coolant controller 66 and reactor controller 70. The model provides for more stable and reliable reactor temperature control, and thus identifies design conditions of the coolant system more accurately. The improved tuning combined with lower turndown ratios and reduced maximum coolant flows permits a single cooler control valve configuration, which saves equipment and maintenance costs.

Simulation Model—Reactor Temperature Control

A dynamic simulation model may be developed to evaluate reactor coolant system design/control scheme and to assist in troubleshooting reactor temperature control problems. The model may be developed using Aspen™ simulation software (Aspen Plus™ and Aspen Custom Modeler™) or other simulation software, such as Simulation Sciences (SimSci) Pro/II™

A. Evaluation of Existing Design

The reactor coolant system design basis may be evaluated by collecting key design conditions/variables and operational requirements and by performing a capacity analysis. Data collected may include equipment/instrument datasheets and performance information, piping layout, and prior hydraulic calculations. Various parameters that may be analyzed include the capacity of the reactor coolant coolers, coolant pump, and coolant system valves, as well as the region where the control valves operate. To accomplish the capacity evaluation, a sensitivity analysis of key process variables versus load requirements of the reactor coolant coolers may be performed. The process variables may include reactor temperature, polyethylene production rate, reactor heat transfer coefficient, and cooling tower water (or sea water) temperature.

Based on this type of analysis, it may be observed that reactor coolant systems often have a large surplus capacity. Due to this surplus capacity, the cooler valves 60 are often oversized. For several key operating scenarios, the percent valve opening may be less than 10%. It is well known in the art that it is preferable for valves to operate between 30% and 70% open. At less than 10% open, the reproducibility of valve flow characteristics (Cv values) are typically poor. In other words, when valves operate at less than 10% open, different flow rates are often produced at constant system conditions. The coolant system design may therefore be improved by changing the valve trim in the cooler control valve so that the valve will not operate at less than 10% open. For example, a valve trim with a bilinear Cv profile may prevent the valve from operating below 10% open, and thus reduce errors in Cv reproducibility. Furthermore, system performance curves and tuning parameters may be developed to give good temperature control for the reactor.

B. Development of Tuning Parameters

Development of tuning parameters for the reactor temperature controller may involve both development of system performance curves and development of proportional integral derivative (PID) parameters for the reactor and coolant controllers.

1. Development of System Performance Curves

The system performance curves identify the relationship between the coolant controller output versus the valve openings for the various temperature control valves (i.e., valves 54, 58, 60). The overall objective in the development of these curves may be to linearize the controller output with the reactor coolant duty requirements. An example basis for setting the controller values is: 0% to 34% controller output for maximum cooling and reactor foul; 35% to 74% controller output for startup and normal polyethylene production; and 75% to 100% controller output for the heating zone and startup. In one example, the percent valve openings of three valves (steam valve 54, cooler bypass valve 58, and cooler valve 60) were each plotted versus percent controller output. See FIG. 11. For coolant systems that utilize two different cooler valves 60 operating in parallel, the plot may include a curve for the fourth valve.

The system performance curves may be developed using the simulation model by performing sensitivity studies on process variables, such as reactor production rate, resin type produced, and cooling tower water (or sea water) temperature. The hydraulic data from actual plant operation may be used to further refine these performance curves, which may be fitted into mathematical equations and input into the DCS control algorithm. A control engineer, for example, may enter the system performance data into the control system configuration, such as into a DCS calculation block. The coolant controller 66 (FIG. 2) via the calculation block may effectively adjust the position of several valves in the coolant system.

2. PID Parameters for the Reactor and Coolant Controllers

Tuning parameters for the reactor and coolant controllers may be developed with the customized dynamic simulation model of the reactor coolant system. Initially, instances of good tuning and control in existing plants with long operating history may be examined. These existing system responses based on key step changes to the reactor temperature set point may be extracted from plant data. The dynamic simulation model may then be tuned by changing the controller PID values to obtain a similar system response as the existing plant for equivalent step changes to the process variable. This approach gives tuning parameters that are adaptable to the current plant of interest. Example values of the tuning constants for the reactor controller are a gain (K1) of 1.0, an integral reset (T1) of 22 minutes, and a derivative action (T2) of 0.4 minute. Example values of the tuning constants for the coolant controller are a K1 of 2.0, a T1 of 20 minutes, and a T2 of 0.4 minute.

C. Model Overview

An embodiment of the model may be constructed in Aspen Plus™ simulation software, although other simulation software, such as SimSci Pro/II,™ may be used to construct the model. The Aspen Custom Modeler™ may be used to customize the simulation flowsheet connectivity to reflect a typical coolant system for a polyethylene loop slurry reactor. Heat transfer correlations may be input based on established heat transfer equations or references and based on years of operating data from existing plants. The exemplary model may be used to assist in the design/troubleshooting of coolant systems for polyethylene plants and may be validated against actual plant behavior.

Figure 4:
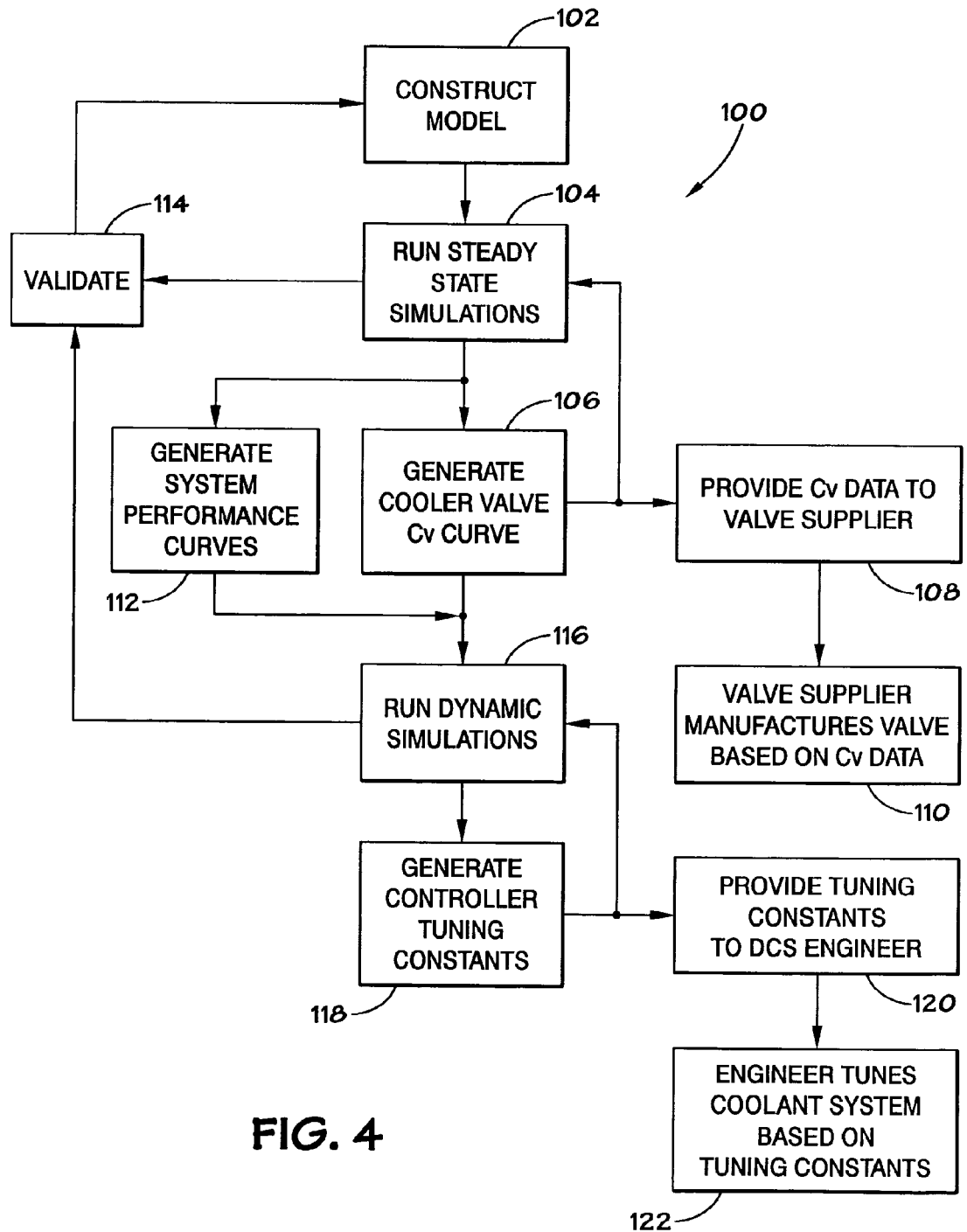
FIG. 4 is a block diagram of an overview of an exemplary simulation model for a loop slurry reactor in accordance with the present invention.

Referring to FIG. 4, a flow diagram of an overview of a simulation model for designing and improving polyethylene loop slurry reactor temperature control and coolant systems is depicted. In this embodiment, the model is applied to polyethylene reactor (polymerization) temperature control. The model may also be applied to other polyolefin polymerizations, such as polypropylene polymerization in loop slurry reactors, which have similar reactor coolant systems.

The model may be used to construct a site-specific model updated for the specific plant configuration of interest (block 102). Once the engineer updates the model, steady state simulations (block 104) may be run to iteratively generate Cv curves (block 106) for the coolant control valve 60 (FIG. 2). The Cv curve is a flow characteristic of a control valve and is a function of the flow and pressure drop across the valve. In other words, the Cv of a valve is the flow rate through a valve at a given pressure drop. The trim (i.e., plug and seat) of the valve may be modified (i.e., machined) to give different Cv curves for the same valve body. The Cv (flow characteristic) of cooler valve 66 facilitates the ability of the coolant system 12 to maintain the coolant supply temperature at the desired set point and, thus, to control the reactor temperature 82. Upon convergence, the engineer may, for example, provide the Cv curve to a valve supplier (block 108) who manufactures the valve in accordance with the desired CV data (block 110).

Additionally, steady state simulations (block 104) may be used to generate system performance curves (block 112) for one or more control valves in the coolant system (i.e., valves 54, 58, and 60). The model is applicable to a variety of configurations. In one embodiment, operating data for three valves are captured (steam valve 54, cooler bypass valve 58, cooler valve 60). In another embodiment, performance data is captured for these three valves and for a fourth valve—the second cooler valve of the old configuration previously discussed. The system performance curves are a plot of coolant controller output (in percent) versus the valve opening (in percent). See FIG. 11. A control engineer may use the system performance curves (for the valves) to build a calculation block in the distributed control system (DCS). A calculation block in the DCS may be used to define the output control action of coolant controller 66 (FIG. 2) sent to one or more control valves in the coolant system.

Finally, the steady state simulation may be validated against actual plant data. Output of the model, whether a model of an existing plant or of a new plant design, is compared against behavior in existing polyethylene reactor coolant systems to validate the model (block 114), and the model may be revised as appropriate.

The engineer may run dynamic simulations (block 116) to iteratively generate controller tuning constants (block 118) for both the reactor controller 70 and the coolant controller 66 (FIG. 2). The final tuning constants are, for example, provided to a DCS engineer (block 120). A DCS engineer (block 122) tunes the existing coolant system with the new tuning constant values, or enters these new values into the design basis of a new polyethylene reactor coolant system. As with the steady state simulations, the engineer/modeler validates dynamic simulations (block 114) against actual plant data. For example, the engineer compares simulated responses of the reactor controller, coolant controller, reactor temperature, and coolant temperature against existing plant behavior, and adjusts the model accordingly.

D. Model Construction

Referring to FIG. 5, a block diagram of a model construction 102 technique is depicted. The block diagram corresponds to block 102 of FIG. 4. The engineer updates the existing model by inputting the design basis for the specific reactor coolant system of the current plant configuration (block 130). The engineer normally constructs a site-specific model by modifying the existing model. The engineer, however, may use the existing model as a reference and construct a site-specific model from "scratch" in a simulation software, such as Aspen Plus™ or SimSci Pro/II.™

1. Flowsheet Connectivity and Control Scheme

A part (block 132) in the model construction is to select components in the simulation software that approximate the components of the coolant system, connect those components on a simulation flowsheet, and enter the control scheme into the model. One approach is to use the existing model and to adjust the model to match the current plant configuration. If using Aspen Plus™ software, the Custom Modeler™ within Aspen may be used for the flowsheet connectivity and to input the control scheme. Similar customizing devices within other simulation software packages may also be used for the flow sheet connectivity. Those of ordinary skill in the art will recognize that this phase of the model construction involves engineering judgment in matching components and their interactions in the software with components and their interactions in the real world. This phase often involves extensive validation against actual plant data.

2. Hydraulic Information and Heat Transfer Information

Block 132 represents two categories of inputs: hydraulics data and heat transfer data. In general, the engineer may obtain the hydraulic and heat transfer information by calculation or from vendors or references, and input the information into the model in the form of correlations. An approach is to prepare much of the data up front, outside of the model, and then to enter final correlations into the model. Correlations (or fits) may be tweaked to better replicate actual plant data before being input into the model.

The hydraulic information, such as the piping layout, valve flow characteristics, and heat exchanger pressure drop profiles, may be useful for the model to simulate the flow rate, velocity, and pressure drop profile through the coolant system 12. Coolant system hydraulic inputs may include, for example, the coolant piping layout, coolant pump 26 performance curve, control valve flow characteristics (i.e., Cv curves for valves 58 and 60), and heater 48 and cooler 50 pressure drop profiles as a function of flow rate.

The engineer may obtain the necessary piping layout information from the piping construction isometrics, which give the straight lengths of pipe, the pipe sizes, and the pipe fittings, such as elbows, tees, etc. As will be understood by those of ordinary skill in the art, the engineer may reduce the piping layout to equivalent lengths (i.e., in feet or meters) and these values input into the model. Each segment in the model flow sheet, for example, may have an equivalent length of piping associated with that segment. The engineer may obtain the hydraulic (performance) curve for the coolant pump 26, typically a centrifugal pump, from the vendor. The pump performance curve is, for example, the relationship between the pump head and flow for various impeller sizes and speeds. The engineer may obtain the valve Cv curves for the coolant system control valves (valves 54, 58, 60) from the vendor. The Cv data for the cooler valve 60, however, may change as the model is operated to give the desired new Cv data for the cooler valve 60. The engineer may obtain cooler 50 and heater 48 pressure drop profiles from the vendor. In general, data supplied by vendors are often discrete values. It may be beneficial to fit this data to polynomials, for example, and input the equations (instead of the discrete values) into the simulation model.

Heat transfer information, such as heat transfer coefficients and heat transfer surface area, may be used to evaluate the capability of the coolant system to remove heat from the reactor. Heat transfer inputs (block 132) may include, for example, the cooler 50 heat transfer coefficient and surface area, the reactor jacket 16A-H heat transfer coefficient and surface area, and the heat of reaction for polymerizing polyolefin (i.e., 1440 Btu's per pound of polyethylene). The type of heat transfer inputs may be related to the fundamental equation that the amount of heat transferred (Q) in a heat exchanger is equal to the product of the overall heat transfer coefficient (U) times the heat transfer surface area (A) times the log mean temperature difference ($\Delta T_{LM}$) between the two fluid streams exchanging heat:

$$Q = U \times A \times \Delta T_{LM}$$

In this equation, it is usually the heat transfer coefficient that is the most complex to calculate, especially in a system, such as the reactor coolant system, which may exhibit strong dynamic behavior. Heat transfer coefficients are the heat transfer capability of a given heat exchanger and may be a function of the materials of construction, fluid viscosity, fluid temperature, fluid velocity, and other variables. The approach for developing heat transfer coefficients for the model may be to first develop a correlation based on vendor data, or established heat transfer equations (such as the Colebrook equation), or references (such as the Kerns Heat Transfer Handbook), and then to update the fitted correlation to better replicate observed data in existing plants before input into the model.

Heat transfer coefficient correlations for both the cooler 50 and reactor jackets 16A-H may be entered into the model. A heat transfer coefficient for the heater 48 typically does not exist for direct steam injection. A heat transfer coefficient for a heater 48 that is a shell and tube exchanger is typically supplied by the vendor. The coefficient, however, may be calculated by the engineer using suitable heat transfer equations and/or software. For the cooler 50, the engineer typically obtains from the vendor discrete values of the cooler 50 heat transfer coefficient as a function of coolant flow through the cooler. This cooler 50 data may be fit to an equation using, for example, Microsoft Excel™ or Mathematica,™ and the correlation entered into the model. The engineer, however, may also derive a heat transfer coefficient correlation using heat transfer equations and/or software.

For the reactor jackets, the heat transfer coefficient data are generated, for example, by using the Colebrook equation, in Mathematica™ or Excel.™ It should be noted that any suitable heat transfer equation may be used to determine a correlation for the heat transfer coefficients. The Colebrook equation calculates film coefficients for the reactor and coolant sides of the reactor jacket. These film coefficients are inversely summed with the reactor wall (metal) conductivity to give the inverse of the overall heat transfer coefficient of the reactor jacket. The film coefficient on the reactor slurry side of the jacket may be a function of the polyethylene slurry density, slurry viscosity, slurry conductivity, reactor pipe diameter, and dimensionless values, such as the Reynolds number and Prandtl number. Similarly, for the coolant side of the reactor jacket, the coolant film coefficient may be a function of coolant conductivity, pipe diameter, and dimensionless quantities, such as the Reynolds number and Prandtl number. Ultimately, an equation for the reactor jacket overall heat transfer coefficient as a function of process variables, such as reactor temperature and reactor slurry density, may be generated for input into the model. It is usually beneficial to tweak the fit of the equation to actual plant data before entering the correlation into the model.

The heat transfer area is the surface area through which heat exchanges between the utility fluid (i.e., coolant) and process fluid (i.e., reactor slurry). The surface area calculation is based on the geometry of heat exchanger components that contact both the utility and process fluids. For example, the surface area calculation for the reactor jacket (an annulus) is simply a calculation based on the geometry of the reactor pipe within the jacket pipe. The reactor jacket heat transfer area is the surface area of the reactor pipe enclosed by the reactor jackets. The engineer may calculate the heat transfer area for each reactor jacket and input these calculated values into the model. The engineer may instead rely on the model to calculate the heat transfer area based on jacket length and reactor pipe diameter. For the cooler 50, the engineer typically obtains the heat transfer area from the vendor or equipment data sheet.

In conclusion, the initial model is constructed (block 102) upon completion of connecting the components in the flow sheet and finalizing the input of the control scheme, and upon inputting and revising hydraulic and heat transfer data to match the design basis of the reactor coolant system.

D. Model Applications

1. Cooler Valve—Flow Characteristic (Cv Curve)

Referring to FIG. 6, an overview 140 of steady state simulations performed to generate final flow characteristic (Cv) data for the coolant control valve 60 (FIG. 2). An initial Cv curve for the cooler valve 60 is entered into the model. The engineer or modeler (or operator) runs steady state simulations varying operating conditions (block 104), such as reaction temperature, production rate, the temperature of the cooling tower water supply or the sea water supply, and/or the slurry density in the reactor. For each simulation, the coolant flow through the cooler 50 and the pressure drop across the cooler valve 60 are measured (block 106A) and a Cv value is calculated (block 106B) for each simulation run. The new Cv curve, if appropriate, is entered into the model, replacing the old Cv curve (block 142), until the iterative steady state simulations converge on a final Cv curve for the cooler valve 60 (block 106C). The engineer evaluates the simulated responses for acceptable coolant temperature control, reactor temperature control, and reactor stability in determining when the Cv data has converged (block 106C). The final Cv curve data is supplied to the vendor (block 108). Blocks 106A, 106B, and 106C correspond to the single block 106 of FIG. 4.

Figure 7:
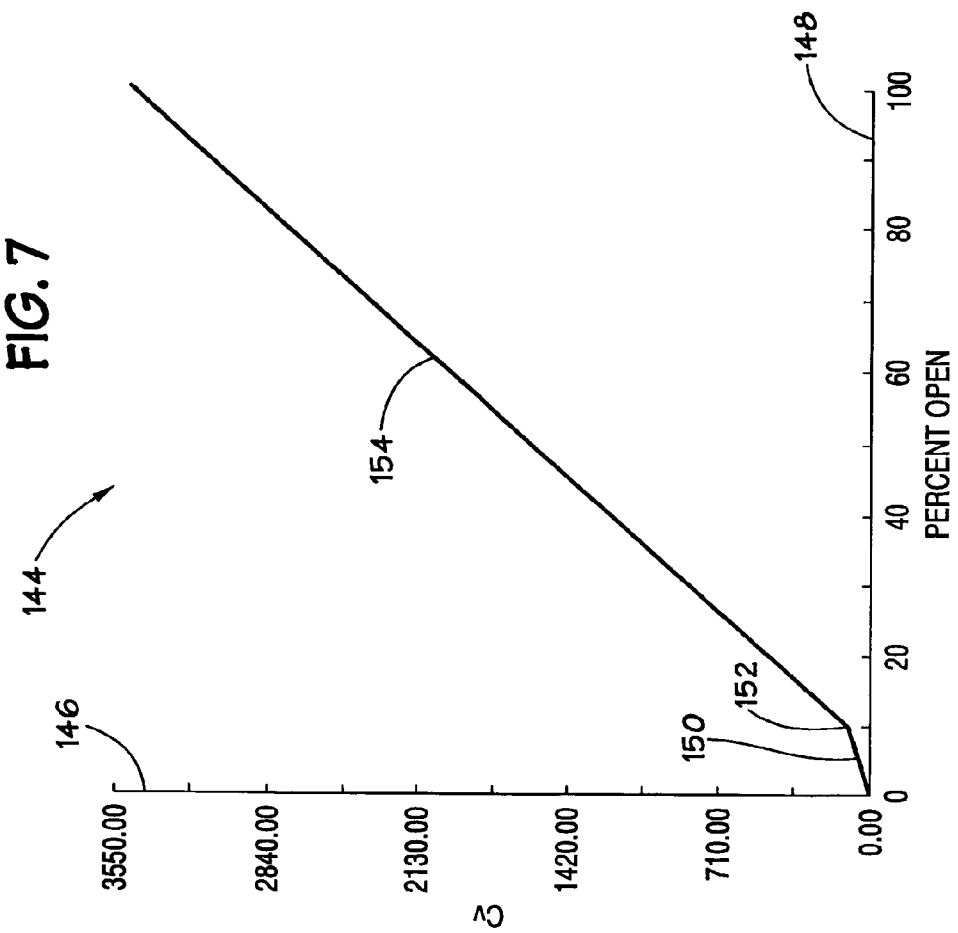
FIG. 7 is a representation (plot) of a bilinear Cv curve for the cooler valve in the reactor coolant system in accordance with the present invention.

Referring to FIG. 7, a Cv curve plot 144 that plots the Cv 146 versus percent open 148 is depicted. Plot 144 is a representation of the bilinear Cv behavior that may be desired for the cooler valve 60, and is an example of the data that is supplied to the vendor. The bilinear nature of the Cv behavior gives improved temperature control in the polyethylene reactor. The initial smaller slope (Cv line 150) provides for better control at higher turndown, for example, for polyethylene grades that require lower coolant capacity, and especially at lower polyethylene production rates. One benefit of this bilinear behavior is the elimination of the need for two control valves on the discharge of the cooler 50. The design for a single cooler valve 60 reduces equipment costs because a single valve costs less than two valves and because other equipment in the coolant circulation only need be designed to handle the maximum flow of a single valve. Additionally, the control and piping configuration may be simplified. The simulation model also generates more certainty about the reactor temperature control and, thus, permits designing equipment to capacity in the coolant system. Therefore, the size of the coolant pump 26, as well as the pipe and valve sizes in the coolant system 12, may be reduced.

The region 152 at which the slope of the Cv curve changes may be determined in a variety of ways. In general, the region where the slope of the bilinear (or substantially bilinear) Cv curve changes slope should correspond to conditions at or below the plant design turndown requirements. The analysis will typically focus on low coolant flow rates through the control valve (low percent open). In particular, one approach may be to choose a particular grade of polyethylene at a given manufacturing site that requires the least cooling capacity of the site product mix at or below plant design turndown requirements. Accordingly, the steady state simulations may be run at various production rates with a minimum, for example, at fifty percent of the normal production rate of the least demanding polyethylene grade.

In this context, "least demanding" polyethylene grade may generally correspond to a grade with polymerization reactor conditions allowing for higher acceptable coolant supply 22 temperatures, less flow through cooler 50, and less flow through cooler valve 60. The "least demanding" polyethylene grade is typically polymerized at a higher reactor temperature, and thus the log mean temperature difference in the reactor jackets 16A-H is higher. As a result, the driving force for heat transfer is greater and thus the coolant system 12 is less taxed.

Ultimately, low-end production rates combined with the low coolant capacity requirement of the particular polyethylene grade may determine the region at which the bilinear Cv curve changes slope. The transition point or transition region 152 where the slope changes is generally less than 50% valve opening and should be chosen so that the turndown of the control valve and Cv reproducibility are increased. Furthermore, the line 154 after the slope change will generally have a steeper slope than the line 150 before the slope change. The slope change at region 152 may be relatively sharp, as depicted, or gradual.

Figure 8:
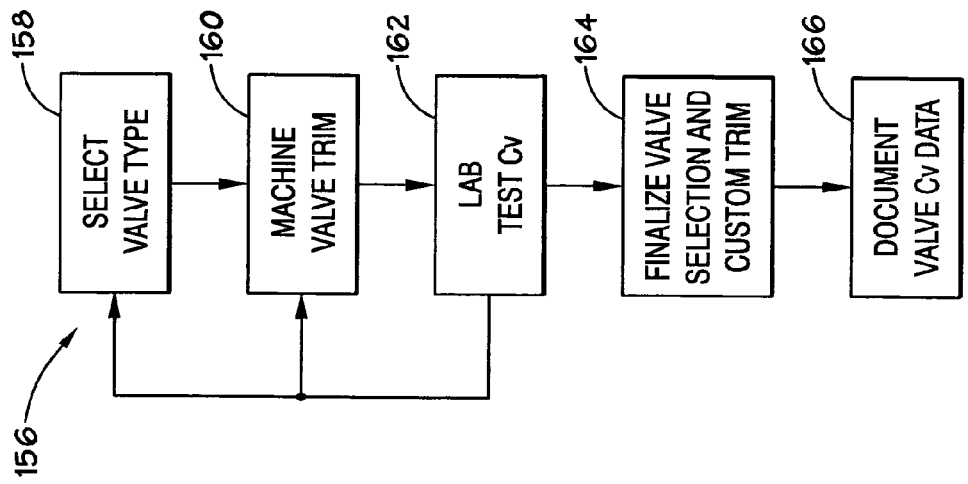
FIG. 8 is a block diagram of a process used by a valve supplier to manufacture a valve with a desired CV characteristic in accordance with the present invention.

Referring to FIG. 8, a block diagram of a process 156 the valve supplier uses to manufacture the cooler control valve 60 (FIG. 2) based on supplied desired Cv data is depicted. Initially, based on desired Cv data, the valve manufacturer will select a valve type (block 158). The three most common valve types are quick opening, linear, and equal percentage. For the desired bilinear behavior illustrated in FIG. 7, the valve manufacturer would generally select a linear valve or an equal percentage valve. The valve manufacturer may machine the valve trim (block 160) in an effort to modify the valve so that the actual Cv of the valve matches the desired Cv. The valve trim may be defined as the wetted parts of the valve in contact with the process fluid. For example, the trim may include the plug and the seat area. The valve supplier tests the valve (block 162) to determine the actual Cv data for the custom machine valve and will continue to machine the valve until the lab testing Cv data produces the desired Cv behavior (for example, a bilinear Cv curve). The valve supplier finalizes the valve selection and custom trim (block 164) and documents the valve Cv data for that custom valve (block 166).

Figure 9A:
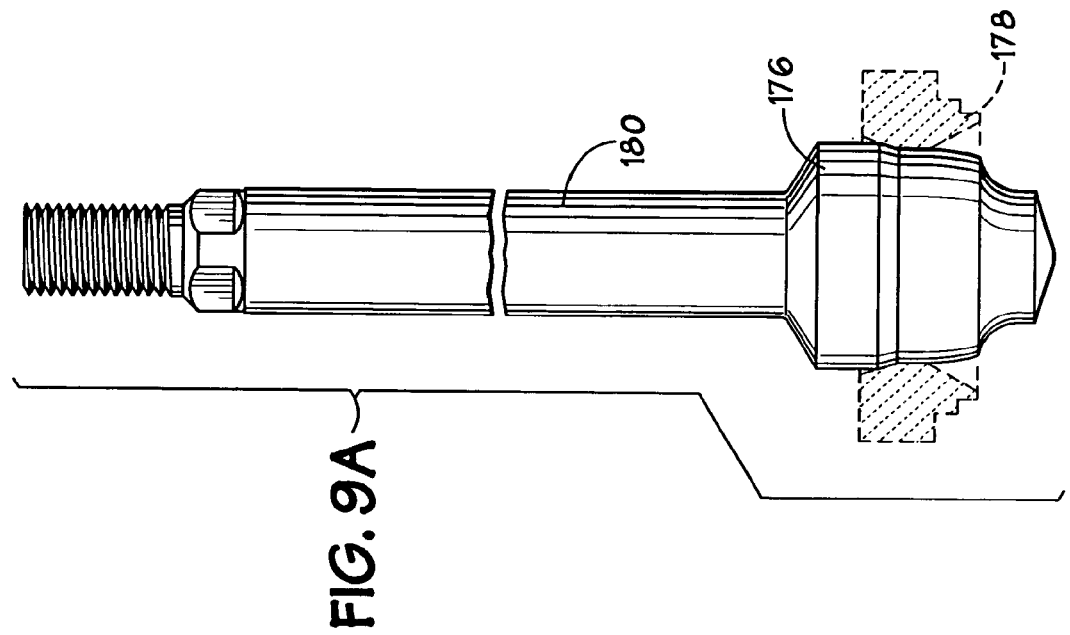
FIGS. 9 and 9A are a schematic of an exemplary globe valve with a bilinear trim in accordance with the present invention.
Figure 9:
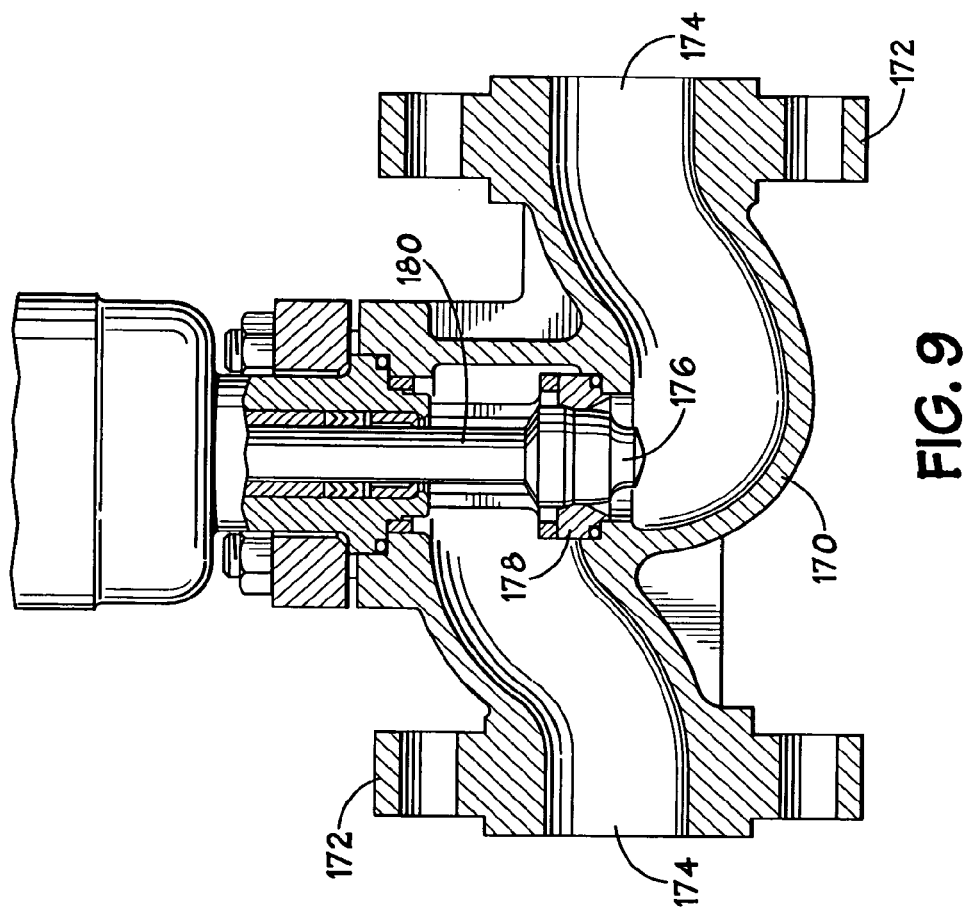

FIG. 9 is a schematic of an embodiment of the cooler valve 60. In this example, the valve type is a globe valve with a bilinear trim. The body 170 is constructed, for example of carbon steel. The flanges 172 are used to connect the valve 60 in the piping system. Other connection types, such as screwed connections, may be used to install the valve 60 into the coolant piping. The coolant flows through the port 174. The trim may be defined as the plug 176 and the seat 178. The bilinear flow (Cv) behavior of the valve may be obtained by machining the plug 176 and/or the seat 178. FIG. 9A is an exploded view of the plug 176 and is an example of a custom-machined plug used to give bilinear behavior of the flow characteristic (Cv). The valve may operate by an actuator (not shown) moving the valve stem 180 vertically to raise and lower the plug 176. The valve stem 180 may merge with an actuator stem (not shown).

The position of a control valve typically represents the position of the valve actuator and can be correlated with the flow rate through the valve. A valve position of 0%, for example, may represent a closed valve (i.e., the actuator fully extends the valve stem) with no flow through the valve. A valve position of 100% may represent a fully open valve (actuator fully retracts the valve stem) with a maximum flow rate through the valve. Correlations may take into account varying system conditions such as pressure drop across the valve. Furthermore, the valve position may be indicated by approximations of the 0-100% range, such as a range of −7.9% to 105%.

2. Coolant Controller Calculation Block

Figure 10:
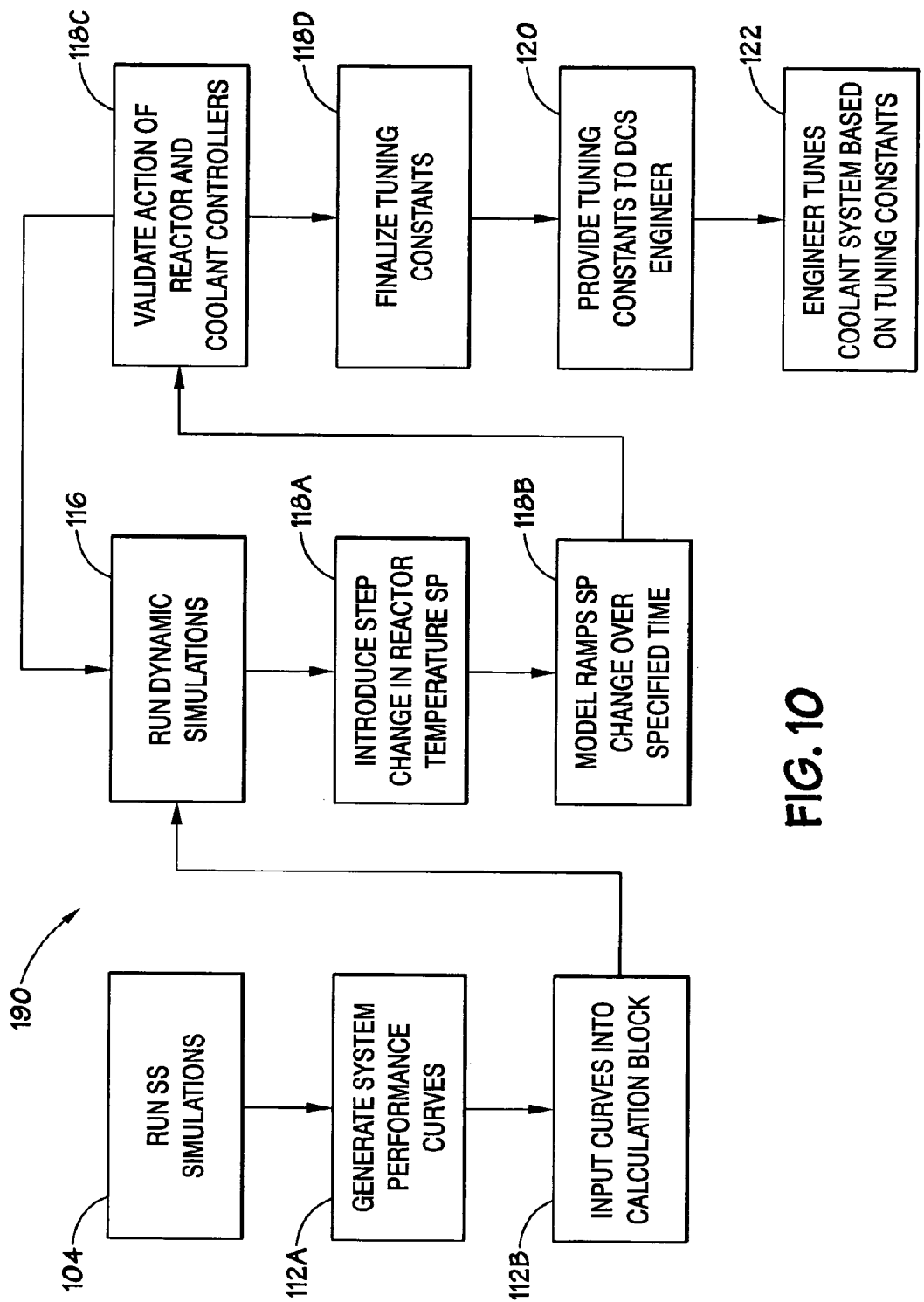
FIG. 10 is a block diagram of a method for configuring a DCS calculation block and generating tuning constants for a reactor controller and coolant controller in accordance with the present invention.

Referring to FIG. 10, a block diagram of a modeling process 190 for generating tuning constants for coolant controller 66 and reactor controller 70 (FIG. 2) is depicted. Before the controllers can be tuned in the model, the calculation block for manipulating the coolant controller output typically is first established. This is accomplished by running steady state simulations, varying the operating conditions, and generating operating data (system performance curves) for the three control valves in the coolant system (blocks 104 and 112A). The modeler places the data for these three control valves into a DCS calculation block (block 112B) and inputs the desired behavior of the coolant controller 66 action (output 68) relative to the performance or operating data of the three valves. For example, in the calculation block, the modeler may correlate the percent range of the controller output with the valve positions. A linear correlation may be beneficial. Note, before discussing subsequent portions of FIG. 10, such as dynamic simulations and tuning constants, FIG. 11 is first utilized to explain the steady state simulations (block 104), the generation of system performance curves (block 112A), and construction of the calculation block (block 112B).

Referring to FIG. 11, a plot of system performance curves 200. Valve opening (%) 202 is plotted against coolant controller output (%) 68. The three curves 206, 208, and 210 represent operating data for three control valves under review in the coolant system. Curve 206 represents an example of the performance for the cooler valve 60 (FIG. 2), which is often the most critical valve. Curve 208 represents an example of the performance of the cooler bypass valve 58 (FIG. 2), which is used as the heater valve on start-up. Curve 210 represents an example of the performance for steam supply valve 54, which should only open during start-up of the reactor when heat is needed.

To generate the system performance curves, steady state simulations that vary operating conditions, such as production rate, reactor temperature, reactor slurry density, and cooling tower water (or sea water) supply temperature may be run. A percent open value for each valve in each simulation run is calculated and plotted versus the coolant controller output (in percent). The overall objective in the development of these curves may be to linearize the controller output with the reactor coolant duty requirements. An example basis for setting the controller values is: 0% to 34% controller output for maximum cooling and reactor foul; 35% to 74% controller output for startup and normal polyethylene production; and 75% to 100% controller output for the heating zone and startup.

In this example, increasing coolant controller output 68 correlates linearly with lessening heat generation in the reactor. As controller output 68 increases, it reduces the flow through the cooler valve 60 to increase the reactor coolant supply temperature and also increases the flow through the cooler bypass valve 58 to balance the hydraulics to maintain a constant total coolant rate. Further increases in the coolant controller output 68 cross into a region that represents start-up of the reactor, where the coolant system may supply heat to the reactor. Curve 210 represents the steam valve opening during start-up. In this example, a 100% output on the coolant controller represents the initial phase of start-up, requiring the most demand for steam via valve 54 and the most demand for flow through the heater 48 (and flow bypass valve 58). The system performance curves 200 are input into the DCS calculation block, which is generally done before the tuning constants of the reactor and coolant controllers are determined.

3. Tuning Constants

Returning to FIG. 10, once the data calculation block is established (block 112B), the engineer/modeler may run dynamic simulations (block 116) to establish tuning constants for the reactor controller and the coolant controller. The modeler may introduce, for example, a step change in the reactor temperature set point in the model (block 118A). The model (block 118B) may ramp the temperature set point change, such as a 0.5° F. change, over a specified time, such as two minutes. The modeler may compare the response of the control valves and the reactor temperature action against existing plant data to validate the control (block 118C). After validation, the tuning constants are finalized (block 118D) and provided to the DCS engineer (block 120) who tunes the reactor and coolant controllers (block 122).

Referring to FIG. 12a, an exemplary plot of the reactor controller 70 variables over time (axis 214) is depicted. The plot may represent a simulated reactor controller 70 in an existing plant or new plant design. The input to the controller 70 is the actual reactor temperature 82. The reactor temperature set point 216 is entered by the operator. The reactor controller output (control action 218) writes new coolant supply temperature set points to the coolant controller 66. In this example, reactor temperature set point 216 in reactor controller 70 is changed from 218.0° F. to 218.5° F. The 0.5° F. is ramped over 2 minutes. The actual reactor temperature 82 increases in response to control action 218 increasing the coolant temperature set point. The reactor temperature 82 increases to match the reactor temperature set point. The gain (K1) tuning constant is generally tuned to optimize the amplitude of the control action 218 and/or reactor temperature 82 response. Any offset 220 (or bias) may be mitigated by adjusting the integral reset (T1) tuning constant.

Referring to FIG. 12b, an exemplary plot of the coolant controller 66 variables over time (axis 214) is depicted. The plot may represent a simulated coolant controller 66 in an existing plant or new plant design. The input to the controller 66 is the actual temperature 90 of the coolant supply 22 (FIGS. 1 and 2). The coolant supply temperature set point 222 is supplied by the reactor controller 70 output 218. The coolant controller 66 (output 68) adjusts the valve opening positions of the one or more control valves in the coolant system to control the coolant supply temperature. In the same example of FIG. 12a, the coolant controller 66 receives new set points 222 (corresponding to output 218) from the reactor controller 70. The actual coolant supply temperature 90 changes in response to coolant control action 68 to match the set point 222 received from the reactor controller 70. The ultimate effect of the coolant controller 66 is to operate in cascade scheme with the reactor controller 70 to maintain the reactor temperature 82 at set point 216.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for designing a temperature control system, the method comprising the acts of:
    constructing a first model of an interaction of a temperature control system and a polyethylene loop slurry reactor using simulation software disposed on a computing device;
    simulating the interaction of the temperature control system and the polyethylene loop slurry reactor at two or more steady state operating conditions in a range of interest using the first model and the simulation software to generate first simulated responses;
    calculating a Cv value for a temperature control valve regulating flow of a cooling fluid through cooling jackets of the polyethylene loop slurry reactor at each of the two or more steady state operating conditions based on the first simulated responses;
    generating a first Cv curve by plotting each of the calculated Cv values on a first plot;
    modifying the first model using the first Cv curve to construct a second model;
    simulating the interaction of the temperature control system and the polyethylene loop slurry reactor at the two or more reactor thermal steady state operating conditions in the range of interest using the second model and the simulation software to generate second simulated responses;
    comparing actual data representative of the interaction of the temperature control system and the polyethylene loop slurry reactor with the second simulated responses; and
    modifying the second model based on the comparison of the actual data with the second simulated responses to construct a validated model such that one or more components of the temperature control system are configured to maintain a temperature of the polyethylene loop slurry reactor within a desired operating range when using the validated model.

2. The method of claim 1, wherein the one or more components comprise a temperature control valve, a reactor temperature controller, or a coolant temperature controller.

3. The method of claim 1, comprising designing a valve trim of the temperature control valve to correspond to the first Cv curve.

4. The method of claim 1, wherein the polyethylene loop slurry reactor comprises cooling jackets configured to cool the polyethylene loop slurry reactor, and constructing the first model comprises inputting hydraulic information and heat transfer information for the polyethylene loop slurry reactor cooled with the cooling jackets into the simulation software.

5. The method of claim 4, wherein inputting hydraulic information and heat transfer information comprises inputting a cooling piping layout, a coolant pump performance curve, a cooler heat transfer coefficient, a reactor jacket heat transfer coefficient, or combinations thereof.

6. The method of claim 1, wherein calculating the Cv value comprises:
    obtaining a first flow rate of the cooling fluid from the first simulated responses;
    obtaining a first pressure drop of the cooling fluid across the temperature control valve from the first simulated responses; and
    calculating the Cv value using the first flow rate and first pressure drop.

7. The method of claim 6, comprising:
    calculating the Cv value for the temperature control valve at each of the two or more steady state operating conditions based on the second simulated responses;
    generating a second Cv curve by plotting each of the calculated Cv values on a second plot;
    modifying the second model using the second Cv curve to construct a third model; and
    simulating the interaction of the temperature control system and the polyethylene loop slurry reactor at the two or more reactor thermal steady state operating conditions in the range of interest using the third model and the simulation software to generate third simulated responses.

8. The method of claim 7, comprising:
comparing the first Cv curve and the second Cv curve for convergence; and
modifying the second model using the second Cv curve only if the first and second Cv curves are not converged.

9. The method of claim 1, comprising generating a system performance curve of the temperature control valve using the model output.

10. The method of claim 9, building a calculation block of the temperature control system based on the system performance curve.

11. The method of claim 1, comprising:
simulating the interaction of the temperature control system and the polyethylene loop slurry reactor at two or more dynamic operating conditions of the polyethylene loop slurry reactor in the range of interest using the second model and the simulation software to generate dynamic simulated responses;
generating tuning constants for the temperature control system using the dynamic simulated responses; and
inputting the tuning constants into the temperature control system.

12. The method of claim 1, wherein the desired operating range is between approximately +/−0.25° F. of a temperature setpoint of the polyethylene loop slurry reactor.

13. The method of claim 1, wherein the temperature control system comprises:
a secondary controller configured to control a flow rate of the cooling fluid by adjusting the temperature control valve; and
a primary controller configured to control the temperature of the polyethylene loop slurry reactor by adjusting a setpoint of the secondary controller.

* * * * *